(12) United States Patent
Havanur

(10) Patent No.: US 6,788,554 B2
(45) Date of Patent: Sep. 7, 2004

(54) SWITCHED MODE POWER CONVERTER HAVING SYNCHRONOUS RECTIFICATION AND SECONDARY SIDE POST REGULATION

(75) Inventor: Sanjay Havanur, Northridge, CA (US)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 10/409,933

(22) Filed: Apr. 8, 2003

(65) Prior Publication Data

US 2004/0136207 A1 Jul. 15, 2004

Related U.S. Application Data

(60) Provisional application No. 60/439,971, filed on Jan. 13, 2003.

(51) Int. Cl.[7] .............................................. H02M 3/335
(52) U.S. Cl. ..................................... 363/21.06; 363/89
(58) Field of Search .............................. 363/21.06, 89, 363/127

(56) References Cited

U.S. PATENT DOCUMENTS 5,235,502 A * 8/1993 Vinciarelli et al. ........... 363/20

* cited by examiner

Primary Examiner—Shawn Riley
(74) Attorney, Agent, or Firm—O'Melveny & Myers LLP

(57) ABSTRACT

A switched mode power converter includes a transformer having a primary winding and at least one secondary winding, a primary side power switch coupled to the primary winding and adapted to periodically apply an input voltage to the primary winding, and an output filter operatively coupled to the secondary winding to provide an output voltage and output current. First and second active switch devices are operatively coupled in series between the secondary winding and the output filter, and a third active switch device is operatively coupled in shunt with the secondary winding and the output filter. The first and second active switches are arranged such that in an inactivated state each one blocks current between the secondary winding and the output filter in an opposite direction. A control circuit is coupled to the first, second and third active switches. The control circuit activates the first and second active switches synchronously with a first voltage state of the primary and secondary windings and activates the third active switch synchronously with a second voltage state of the primary and secondary windings. The control circuit modulates the activation time of the first and second active switches to regulate at least one of the output voltage and the output current.

17 Claims, 3 Drawing Sheets

SWITCHED MODE POWER CONVERTER HAVING SYNCHRONOUS RECTIFICATION AND SECONDARY SIDE POST REGULATION

RELATED APPLICATION DATA

This patent application claims priority pursuant to 35 U.S.C. § 119(e) to provisional patent application Ser. No. 60/439,971, filed Jan. 13, 2003.

BACKGROUND OF THE INVENTION

1. Field of the Invention

The present invention relates to switched mode power converter circuits. More particularly, the invention relates to single-ended, isolated switched mode power supplies that utilize synchronous rectification and post regulation of the secondary side for multiple outputs.

2. Description of Related Art

Switched mode DC-to-DC power converters are commonly used in the electronics industry to convert an available direct current (DC) level voltage to another DC level voltage. A switched mode converter provides a regulated DC output voltage to a load by selectively storing energy in an output inductor coupled to the load by switching the flow of current into the output inductor. An isolated forward converter is a particular type of switched mode converter in which an input DC voltage is periodically switched across the primary side of a transformer using one or more power switches, typically provided by MOSFET devices. The transformer provides isolation between the voltage source on the primary side and a load on the secondary side. Two diodes on the secondary side rectify the switched and isolated input voltage, including a forward diode connected in series with secondary winding that conducts current to the load when the input voltage is present across the secondary winding and a free-wheeling diode connected in shunt with the secondary winding that conducts current to the load when the input voltage is not present across the secondary winding.

In order to improve the efficiency of the forward converter circuits, it is known to replace the rectifying diodes with power switches (e.g., MOSFET devices) that are controlled by a pulse width modulator (PWM) or other type of controller. The operation of the power switches may be controlled so that they are turned on and off in synchronism with the switched input voltage. The control signals applied to the power switches must be synchronized as closely as possible to the current inflection points of the output inductor. This synchronous rectification provides higher efficiency over the foregoing forward converter configuration since the forward voltage drop of the power switches is much lower than that of diodes.

A switched mode power converter may include plural secondary windings coupled to the transformer with associated rectification circuits in order to provide plural output voltages. Since output regulation within tight tolerances is more difficult to achieve with multiple output voltages, various post regulation methods have been employed on the secondary side of the power converter to achieve desired output regulation. In one such secondary side post regulation method, a saturable magnetic inductor is coupled in series with the forward diode. This method provides high efficiency and good output regulation, but tends to degrade at light load or no load conditions. Also, overcurrent protection is difficult to implement with this method. Moreover, the saturable inductor is bulky and inefficient at high frequencies. In another secondary side post regulation method, a switching device (e.g., MOSFET) is coupled in series with the forward diode. The switching device may be operated using leading edge (i.e., delayed turn-on) or trailing edge (i.e., advanced turn-off) modulation to regulate the amount of current delivered to the load. This method provides excellent regulation, high efficiency, high frequency operation, and lossless overcurrent protection.

Notwithstanding the advantages of these techniques for improving efficiency and regulation, a switched mode power converter that includes both synchronous rectification and secondary side post regulation has not been heretofore available. Accordingly, it would be desirable to provide a switched mode power converter that combines the advantages of synchronous rectification and post regulation to achieve both high efficiency and tight output voltage regulation. It would be further desirable to provide a multiple output switched mode power converter that includes both synchronous rectification and post regulation.

SUMMARY OF THE INVENTION

The present invention provides a switched mode power converter that includes both synchronous rectification and secondary side post regulation.

More particularly, the switched mode power converter comprises a transformer having a primary winding and one or more secondary windings, a primary side power switch coupled to the primary winding and adapted to periodically apply an input voltage to the primary winding, and an output filter operatively coupled to the secondary winding to provide an output voltage and output current. A bidirectional switch comprised of first and second active switch devices is operatively coupled between the secondary winding and the output filter, and a third active switch device is operatively coupled in shunt with the secondary winding and the output filter. The first and second active switches are arranged such that in an inactivated state each one blocks current between the secondary winding and the output filter in an opposite direction. A control circuit is coupled to the first, second and third active switches. The control circuit activates the first and second active switches synchronously with a first voltage state of the primary and secondary windings and activates the third active switch synchronously with a second voltage state of the primary and secondary windings. The control circuit modulates an activation time of the first and second active switches to regulate at least one of the output voltage and the output current.

In an embodiment of the invention, the first and second active switches are coupled together in series between the secondary winding and the output filter. In another embodiment of the invention, the first active switch is coupled to a first end of the secondary winding and the second active switch is coupled to a second end of the secondary winding. The control circuit may be adapted to modulate either a leading edge or a trailing edge of the activation time of the first and second active switches. The first, second and third active switches further comprise MOSFET devices.

In yet another embodiment of the invention, a multiple output power converter is provided in which a plurality of secondary side circuits is coupled to the transformer. Each secondary side circuit provides both synchronous rectification and secondary side post regulation in accordance with the foregoing embodiments to regulate a respective output voltage and/or output current.

In still another embodiment of the invention, a method for regulating performance of a power converter is provided.

The method includes the steps of activating first and second switches to couple current from the secondary winding to the output filter synchronously with a first voltage state of the primary and secondary windings, activating a third switch to maintain current flowing through the output filter while bypassing the secondary winding synchronously with a second voltage state of the primary and secondary windings, and modulating activation time of the first and second switches to regulate at least one of the output voltage and the output current. The modulating step may further comprise modulating either a leading edge or a trailing edge of the activation time of the first and second switches.

A more complete understanding of the switched mode power converter having synchronous rectification and secondary side post regulation will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention satisfies the need for a switched mode power converter that includes both synchronous rectification and secondary side post regulation. In the detailed description that follows, like element numerals are used to describe like elements illustrated in one or more of the figures.

Figure 1:
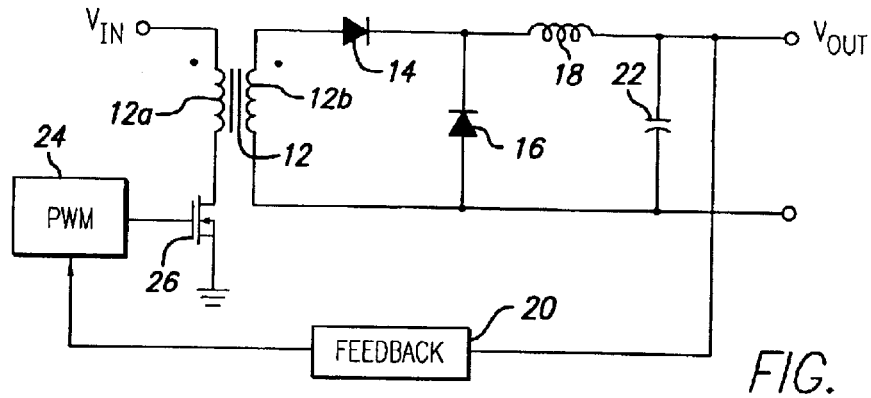
FIG. 1 is a schematic diagram of a prior art isolated forward converter.

Referring first to FIG. 1, a prior art isolated, single end forward converter is shown. The forward converter includes a transformer 12 having a primary winding 12a and a secondary winding 12b. The dot end of the primary winding 12a is coupled to an input voltage source $V_{IN}$ and the other end of the primary winding is coupled to ground through power switch 26. More particularly, power switch 26 comprises a MOSFET device having drain terminal coupled to the primary winding 12a, source terminal coupled to ground, and gate terminal coupled to a pulse width modulator (PWM) 24. The PWM 24 provides periodic activation signals to the power switch 26 in response to feedback signals received from the secondary side of the forward converter (described below). The secondary side of the forward converter includes a forward diode 14 connected in series with the dot end of the secondary winding 12b and a free-wheeling diode 16 connected in shunt with the secondary winding. An output inductor 18 is coupled in series with the forward diode 14 and the secondary winding 12b. The output inductor 18 is further coupled to an output terminal, with a capacitor 22 coupled between the output terminal and ground. The output inductor 18 and capacitor 22 define a filter that provides a smoothed DC output voltage $V_{OUT}$ at the output terminal relative to ground. During operation, a load (not shown) is coupled to the output terminal.

When power switch 26 is turned on, the dot ends of the primary and secondary windings 12a, 12b go positive with respect to the non-dot ends. Current and power flows into the dot end of the primary winding 12a. Forward diode 14 is forward biased and current and power flow out of the dot end of the secondary winding 12b and into the output inductor 18. Current in the output inductor 18 flows through the load, partly through the capacitor 22, and back into the secondary winding 12b. Conversely, when power switch 26 is turned off, current stored in the magnetizing inductance of transformer 12 reverses the polarity of the voltage across primary winding 12a. This causes the dot ends of primary and secondary windings 12a, 12b to go negative with respect to the non-dot ends, causing the forward diode 14 to be reversed biased and turn off. Since the current in the output inductor cannot change instantaneously, the polarity across the output inductor 18 reverses, causing the free-wheeling diode 16 to turn on. Current in the output inductor 18 continues to flow in the same direction through the load, partly through the capacitor 22, and up through the free-wheeling diode 16 back into the output inductor 18. The process then repeats.

The output voltage $V_{OUT}$ is regulated by controlling the duty cycle applied by the PWM 24 to the power switch 26. The output voltage $V_{OUT}$, or a reduced voltage corresponding to the output voltage $V_{OUT}$, is provided as an input to a feedback circuit 20 that provides a control signal to the PWM 24. The feedback circuit 20 may further include an error amplifier that compares the output voltage $V_{OUT}$ (or corresponding voltage) to a reference voltage. If the output voltage $V_{OUT}$ is less than the reference voltage (reflecting increased load or reduced input voltage $V_{IN}$), the control signal to the PWM 24 will increase the duty cycle applied to the power switch 26 to thereby increase the output voltage $V_{OUT}$. Conversely, if the output voltage $V_{OUT}$ is more than the reference voltage (reflecting decreased load or increased input voltage $V_{IN}$), the control signal to the PWM 24 will reduce the duty cycle applied to the power switch 26 to thereby decrease the output voltage $V_{OUT}$. A drawback of this form of primary side voltage regulation is that it is slow to react to transient changes in load.

Figure 2:
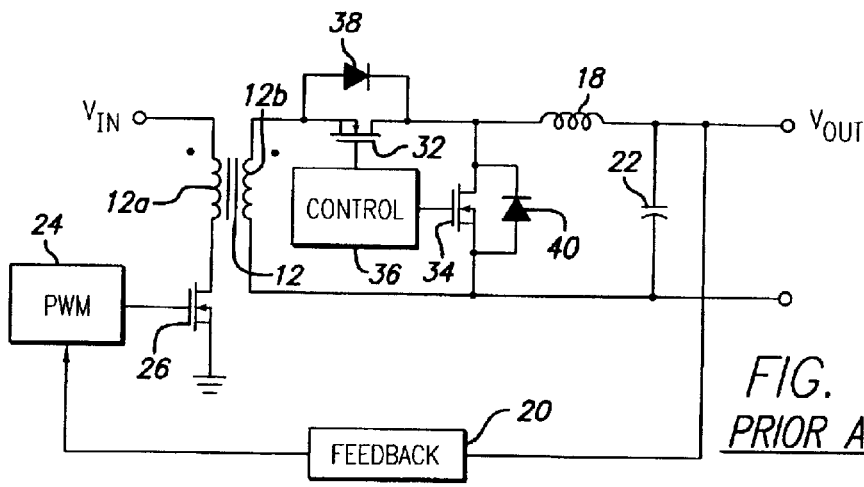
FIG. 2 is a schematic diagram of a prior art isolated forward converter having synchronous rectification.

FIG. 2 illustrates a prior art isolated forward converter having synchronous rectification. The forward converter of FIG. 2 is similar in construction to that of FIG. 1, except that the forward and free-wheeling diodes 14, 16 are replaced with active MOSFET devices 32, 34. The respective internal body diodes 38, 40 of MOSFET devices 32, 34 are also shown. The MOSFET devices 32, 34 are controlled by synchronous control circuit 36 so that the forward MOSFET device 32 is activated when the voltage at the dot ends of the primary and secondary windings 12a, 12b is positive with respect to the non-dot ends, and that the free-wheeling MOSFET device 34 is activated when the voltage at the non-dot ends of the primary and secondary windings 12a, 12b is positive with respect to the dot ends. The voltage drop across the MOSFET devices 32, 34 is substantially less than that of the diodes 14, 16 (see FIG. 1), resulting in greater operating efficiency of the forward converter with synchronous rectification. The forward converter with synchronous rectification otherwise operates substantially the same as the forward converter of FIG. 1.

The synchronous control circuit 36 may receive control signals from a variety of sources in order to synchronize the operation of the MOSFET devices 32, 34 with the voltage across the primary and secondary windings 12a, 12b. For example, the control circuit 36 may monitor the primary side control signals and transfer such signals to the secondary side (e.g., using isolation devices such as opto-isolators). Alternatively, the transformer 12 may include additional windings to transfer synchronizing information to the control circuit 36. In another approach, the synchronizing information may be obtained by monitoring the voltage across the output inductor. On the primary side, the PWM 24 may be controlled by a feedback signal in the same manner as in FIG. 1.

Figure 3:
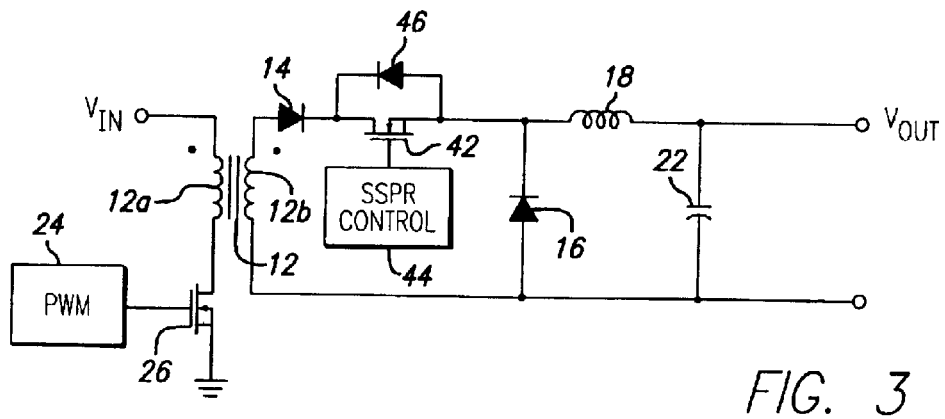
FIG. 3 is a schematic diagram of a prior art isolated forward converter having secondary side post regulation.

FIG. 3 illustrates a prior art isolated forward converter having secondary side post regulation. The forward converter of FIG. 3 is similar in construction to that of FIG. 1, except that a MOSFET device 42 is included in series with the forward diode 14. The internal body diode 46 of MOSFET device 42 is also shown. The MOSFET device 42 is controlled by a Secondary Side Post Regulation (SSPR) control circuit 44 using either leading edge (i.e., delayed turn-on) or trailing edge (i.e., advanced turn-off) modulation to regulate the amount of current delivered to the load. The SSPR control circuit 44 may derive a synchronization signal from the voltage across the secondary winding 12b in order to detect the leading and/or trailing edges of the positive portion of the power cycle. In one known implementation of trailing edge modulation, an error amplifier monitors the output voltage $V_{OUT}$ and compares it to a reference voltage, and a current sense amplifier monitors the output current. When an overcurrent threshold is exceeded, the current sense amplifier sinks current from the error amplifier, causing the SSPR control circuit 44 to shut off the MOSFET device 42. The PWM 24 may be controlled by a feedback signal in the same manner as in FIG. 1, or may provide a fixed duty cycle. As described above, a drawback of the conventional secondary side post regulation implementation is that the voltage drop across the diodes 14, 16 reduces the operating efficiency of the forward converter.

Figure 4:
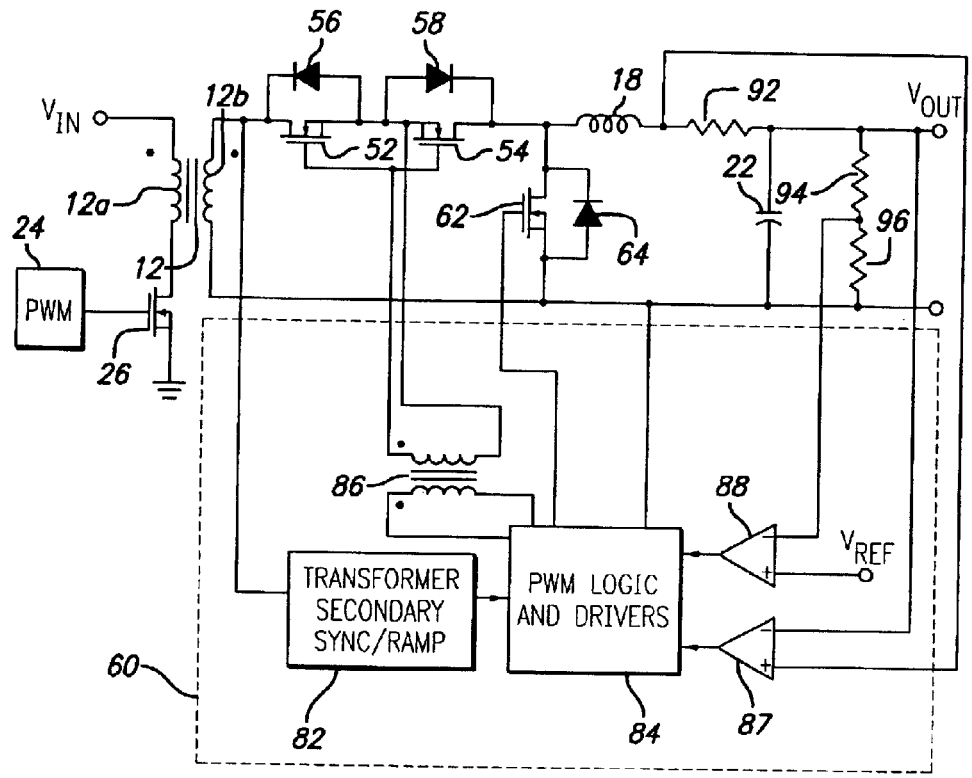
FIG. 4 is a schematic diagram of an isolated forward converter having synchronous rectification and post regulation in accordance with an embodiment of the invention.

Referring now to FIG. 4, an isolated forward converter having both synchronous rectification and post regulation is illustrated in accordance with an embodiment of the invention. Unlike the forward converter of FIG. 1, the forward converter of the present invention does not utilize diodes for rectification. Instead, the forward diode is replaced by first and second active MOSFET devices 52, 54 coupled in series between the secondary winding 12b and the output inductor 18. The output of the forward converter is regulated by modulating the on time of the forward MOSFET devices 52, 54 that act as a bi-directional switch. The voltage on the transformer secondary winding 12b is used to generate a ramp signal that determines the switching frequency and maximum duty cycle applied to the MOSFET devices 52, 54.

Particularly, the drain terminal of MOSFET device 52 is coupled to the secondary winding 12b, the drain terminal of the MOSFET device 54 is coupled to the output inductor 18, and the source terminals of MOSFET devices 52, 54 are coupled together. In addition, free-wheeling diode is replaced by active MOSFET device 62, having the source terminal coupled to ground and the drain terminal coupled to the output inductor 18. The respective internal body diodes 56, 58, 64 of MOSFET devices 52, 54, 62 are also shown. Control circuit 60 provides control signals to the gate terminals of MOSFET devices 52, 54, 62. The gate terminals of forward MOSFET devices 52, 54 are coupled together, so the two devices are activated concurrently. The control circuit 60 derives an oscillator for controlling the timing and duty cycle of the MOSFET devices 52, 54, 62 from the transformer 12. Operation and construction of the control circuit 60 will be described in further detail below.

Prior to the time that power switch 26 is turned on and the dot ends of the primary and secondary windings 12a, 12b go positive with respect to the non-dot ends, the free-wheeling MOSFET device 62 is conducting. When the power switch 26 turns on and the voltage across the primary and secondary windings 12a, 12b goes positive, the free-wheeling MOSFET device 62 is turned off. Then, after a suitable delay, both the forward MOSFET devices 52, 54 are turned on. The delay prevents the forward MOSFET devices 52, 54 and the free-wheeling MOSFET device 62 from conducting at the same time, which would short the secondary winding 12b. Current and power flow out of the dot end of the secondary winding 12b, through both MOSFET devices 52, 54, and into the output inductor 18. Current in the output inductor 18 flows through the load, partly through the capacitor 22, and back into the secondary winding 12b. The forward MOSFET devices 52, 54 can be turned off in a controlled manner in the same manner as the SSPR control circuit 44 of FIG. 3. After the forward MOSFET devices 52, 54 are turned off, the free-wheeling MOSFET device 62 is turned on after a suitable delay. The MOSFET device 62 continues to conduct until the beginning of the next power cycle when the voltage across the secondary winding 12b goes positive again.

The present forward converter achieves regulation of the output voltage $V_{OUT}$ and/or current by modulating the on time of the forward MOSFET devices 52, 54. For example, the MOSFET devices 52, 54 can be turned on after a variable delay from the time the voltage across the secondary winding 12b goes positive and turned off with the negative edge of the transformer voltage, i.e., leading edge modulation. Alternatively, the MOSFET devices 52, 54 can be turned on after a short and fixed initial delay and turned off a variable time before the voltage across the secondary winding 12b goes negative, i.e., trailing edge modulation. It should be appreciated that if the forward MOSFET devices 52, 54 were kept on throughout the positive portion of the power cycle, i.e., without modulating the leading or trailing edge, the forward converter would operate substantially like the conventional forward converter with synchronous rectification described above with respect to FIG. 2. Conversely, if the forward MOSFET device 54 and the free-wheeling MOSFET device 62 were not turned on at any point in the power cycle, but the forward MOSFET device 54 were modulated as described above, the forward converter would operate substantially like the conventional forward converter having secondary side post regulation described above with respect to FIG. 3.

It should also be appreciated that both forward MOSFET devices 52, 54 contribute to proper operation of the forward converter. If MOSFET device 54 were omitted (i.e., shorted), when the voltage across the secondary winding 12b goes negative, the secondary winding 12b would be shorted by the body diodes 56, 64 of respective MOSFET devices 52, 62, which are then coupled in series. This would prevent the transformer 12 from resetting between power cycles. If MOSFET device 52 was omitted (i.e., shorted), turning off MOSFET device 54 would have no effect since current would continue to conduct through the body diode of MOSFET device 54, hence precluding post regulation of the output voltage $V_{OUT}$ and/or current. The presence of MOS- FET device 52 also prevents current shoot through in the transformer that would occur when free-wheeling MOSFET device 62 is conducting and the body diode 58 of forward MOSFET device 54 becomes forward biased at the instant the voltage across the secondary winding 12b turns positive. Thus, forward MOSFET device 52 provides a blocking device during the positive half of the power cycle, and forward MOSFET device 54 provides a blocking device during the negative half of the power cycle. The back-to-back configuration allows the transformer 12 output to be controlled throughout the power cycle.

In an embodiment of the invention, the control circuit 60 further includes a transformer secondary sync/ramp detector 82, PWM logic/drivers 84, device driver transformer 86, voltage error amplifier 88, and current sense amplifier 87. The transformer secondary sync/ramp detector 82 detects the voltage at the dot end of the transformer secondary winding 12b from which a synchronization signal may be derived. The transformer secondary sync/ramp detector 82 utilizes the detected voltage on the secondary winding to control the duty cycle applied to the MOSFET devices 52, 54, such as by detecting the zero voltage crossover of the transformer voltage, generating a synchronized ramp signal, and/or defining the maximum possible duty. The delay between the turn off of the free-wheeling MOSFET device 62 and the turn on of the forward MOSFET devices 52, 54 may be determined by the synchronized ramp signal.

The PWM logic/drivers 84 receive timing signals from the transformer secondary sync/ramp detector 82. The PWM logic/drivers 84 provide control signals to the forward MOSFET devices 52, 54 through transformer 86, which references the gate drive signals to the source terminals of the forward MOSFET devices. The PWM logic/drivers 84 also provide a control signal to the free-wheeling MOSFET device 62. The PWM logic/drivers 84 receive feedback control signals from the voltage error amplifier 88 and the current sense amplifier 87. Voltage divider circuit comprising resistors 94, 96 coupled in series between the output terminals of the forward converter provide a voltage proportional to the output voltage $V_{OUT}$. The voltage error amplifier 88 compares a reference voltage ($V_{REF}$) to the proportional voltage, and provides a signal to the PWM logic/drivers 84 corresponding to the voltage difference. Sense resistor 92 is coupled in series with the output inductor 18. The current sense amplifier 87 provides the PWM logic/drivers 84 with a signal corresponding to the voltage across the sense resistor 92, from which an indication of the output current can be determined.

It should be appreciated that other methods of sensing the output voltage and/or output current could also be advantageously utilized. For example, the output inductor current could be measured using a filter coupled in parallel with the output inductor as disclosed in U.S. Pat. No. 6,424,129, for "Method And Apparatus For Accurately Sensing Output Current In A DC-to-DC Voltage Converter," the subject matter of which is incorporated by reference herein.

Figure 5:
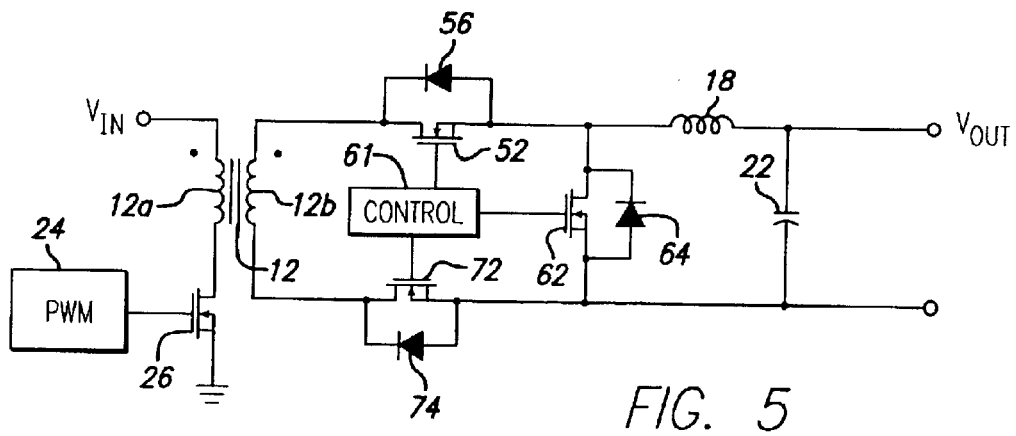
FIG. 5 is a schematic diagram of an isolated forward converter having synchronous rectification and post regulation in accordance with another embodiment of the invention.

FIG. 5 illustrates an isolated forward converter having synchronous rectification and post regulation in accordance with another embodiment of the invention. In this alternative embodiment, the forward MOSFET devices are split apart with a first MOSFET device 52 coupled to the dot end of the secondary winding 12b and a second MOSFET device 72 coupled to the non-dot end of the secondary winding 12b. Particularly, the drain terminal of MOSFET device 52 is coupled to the dot end of the secondary winding 12b and the source terminal of MOSFET device 52 is coupled to the output inductor. The drain terminal of MOSFET device 72 is coupled to the non-dot end of the secondary winding 12b and the source terminal of MOSFET device 72 is coupled to the source terminal of the free-wheeling MOSFET device 62. The respective internal body diodes 56, 74, 64 of MOSFET devices 52, 72, 62 are also shown. Control circuit 61 provides control signals to the gate terminals of MOSFET devices 52, 72, 62.

It should be appreciated that this alternative forward converter circuit will operate substantially the same as the preceding embodiment. An advantage of this alternative forward converter circuit is that MOSFET devices 62, 72 have their respective source terminals coupled together and can therefore be driven by the control circuit 61 using a common voltage reference. The control circuit 61 may otherwise be constructed in substantially the same manner as the control circuit 60 of FIG. 4.

Figure 6:
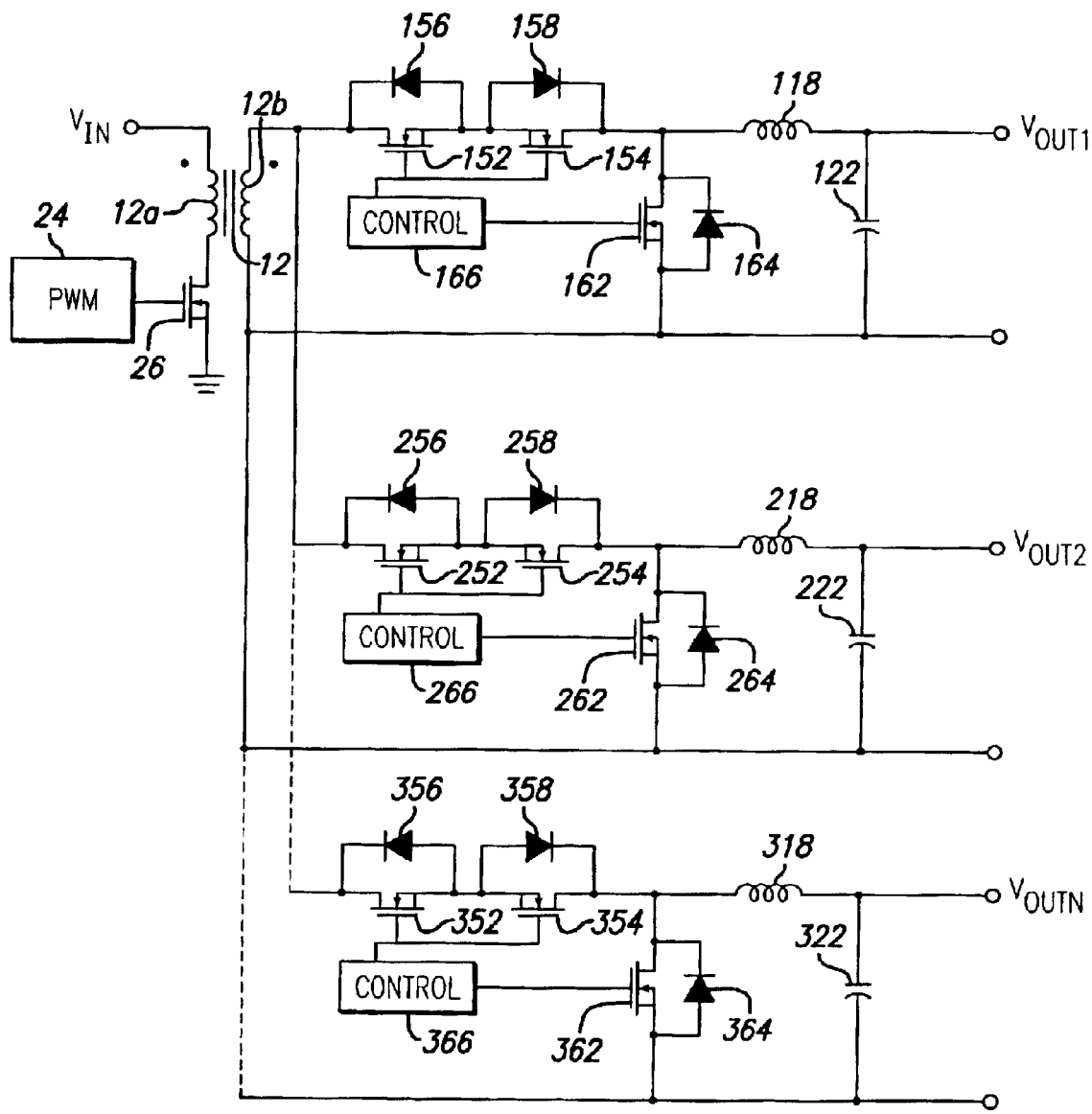
FIG. 6 is a schematic diagram of an isolated, multiple output forward converter having synchronous rectification and post regulation in accordance with yet another embodiment of the invention.

FIG. 6 illustrates an isolated, multiple output forward converter having synchronous rectification and post regulation in accordance with yet another embodiment of the invention. In this alternative embodiment, multiple secondary side circuits are coupled in parallel with the secondary winding 12b to produce multiple output voltages $V_{OUT1}$, $V_{OUT2}$, ... $V_{OUTN}$ having a common ground. Each secondary side circuit is substantially identical to that of the embodiment of FIG. 4. A first secondary side circuit comprises forward MOSFET devices 152, 154, free-wheeling MOSFET device 162, control circuit 166, output inductor 118, and capacitor 122. A second secondary side circuit comprises forward MOSFET devices 252, 254, free-wheeling MOSFET device 262, control circuit 266, output inductor 218, and capacitor 222. An Nth secondary side circuit comprises forward MOSFET devices 352, 354, free-wheeling MOSFET device 362, control circuit 366, output inductor 318, and capacitor 322. It should be appreciated that each secondary side circuit can generate an independently regulated output.

In an alternative embodiment, the transformer 12 may include a plurality of secondary windings respectively coupled in parallel with one or more secondary side circuits to produce multiple outputs in a manner similar to that described with respect to FIG. 6. For example, a first secondary winding may carry outputs $V_{OUT1}$ and $V_{OUT2}$, a second secondary winding may carry outputs $V_{OUT3}$ and $V_{OUT4}$, and a third secondary winding may carry output $V_{OUT5}$, etc. Such an arrangement may be desirable if the values of the different output voltages are widely varied or if the output voltages are required to be isolated from each other.

In the foregoing embodiments of the invention, it should be appreciated that various alternative methods may be used to control the PWM 24 of the primary side. The primary side can be uncontrolled or free-running with a fixed duty cycle under all conditions, without any feedback, synchronizing or any other signals from the secondary side. This is a benefit of this topology. Alternatively, the primary side duty cycle may be varied based on the input voltage. At low input voltages, the primary side may operate with maximum duty cycle which gradually reduces as input voltage is increased. The duty cycle is a function only of the input voltage, i.e., there is no feedback from the output.

When there are multiple outputs; it may be preferable in some circumstances to select one of the secondary side circuits as the main output and control the primary side switch to regulate that one. To accomplish this, a feedback circuit would provide a voltage error signal from the secondary side to the primary side similar to that shown in FIG.

1. The other secondary side circuits can be controlled in the manner described above with respect to FIG. 6. Nevertheless, this construction would have several disadvantages. First, the feedback control would provide only regulation for the main output, but not synchronous rectification. Since the main output typically has the highest current it would stand to benefit the most from synchronous rectification. Further, the main output could not be disabled without pulling down the other outputs. Lastly, the feedback control for the main output can only be voltage mode if trailing edge modulation is used in the secondary side controllers.

Having thus described a preferred embodiment of a switched mode power converter having synchronous rectification and secondary side post regulation, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A switched mode power converter, comprising:
   a transformer having a primary winding and at least one secondary winding;
   a primary side power switch coupled to said primary winding and being adapted to periodically apply an input voltage to said primary winding;
   an output filter operatively coupled to said at least one secondary winding to provide an output voltage and output current;
   first and second active switch devices operatively coupled in series between said at least one secondary winding and said output filter, and a third active switch device operatively coupled in shunt with said at least one secondary winding and said output filter, said first and second active switches being arranged such that in an inactivated state each one blocks current between said at least one secondary winding and said output filter in an opposite direction; and
   a control circuit coupled to said first, second and third active switches, said control circuit activating said first and second active switches synchronously with a first voltage state of said primary and secondary windings and activating said third active switch synchronously with a second voltage state of said primary and secondary windings, wherein said control circuit modulates an activation time of said first and second active switches to regulate at least one of said output voltage and said output current.

2. The power converter of claim 1, wherein said first and second active switches are coupled together in series between said secondary winding and said output filter.

3. The power converter of claim 1, wherein said first active switch is coupled to a first end of said secondary winding and said second active switch is coupled to a second end of said secondary winding.

4. The power converter of claim 1, wherein said control circuit modulates a leading edge of said activation time of said first and second active switches.

5. The power converter of claim 1, wherein said control circuit modulates a trailing edge of said activation time of said first and second active switches.

6. The power converter of claim 1, wherein said first, second and third active switches further comprise MOSFET devices.

7. A switched mode power converter, comprising:
   a transformer having a primary winding and at least one secondary winding;
   a primary side power switch coupled to said primary winding and being adapted to periodically apply an input voltage to said primary winding;
   a plurality of secondary side circuits providing respective output voltages and output currents, each secondary side circuit comprising:
   an output filter operatively coupled to said at least one secondary winding to provide a respective output voltage and output current;
   first and second active switch devices operatively coupled in series between said at least one secondary winding and said output filter, and a third active switch device operatively coupled in shunt with said at least one secondary winding and said output filter, said first and second active switches being arranged such that in an inactivated state each one blocks current between said at least one secondary winding and said output filter in an opposite direction; and
   a control circuit coupled to said first, second and third active switches, said control circuit activating said first and second active switches synchronously with a first voltage state of said primary and secondary windings and activating said third active switch synchronously with a second voltage state of said primary and secondary windings, wherein said control circuit modulates an activation time of said first and second active switches to regulate at least one of said respective output voltage and said respective output current.

8. The power converter of claim 7, wherein said first and second active switches are coupled together in series between said secondary winding and said output filter.

9. The power converter of claim 7, wherein said first active switch is coupled to a first end of said secondary winding and said second active switch is coupled to a second end of said secondary winding.

10. The power converter of claim 7, wherein said control circuit modulates a leading edge of said activation time of said first and second active switches.

11. The power converter of claim 7, wherein said control circuit modulates a trailing edge of said activation time of said first and second active switches.

12. The power converter of claim 7, wherein said first, second and third active switches further comprise MOSFET devices.

13. In a power converter comprising a transformer having a primary winding and at least one secondary winding, a primary side power switch coupled to said primary winding and being adapted to periodically apply an input voltage to said primary winding, and an output filter operatively coupled to said at least one secondary winding to provide an output voltage and output current, a method for regulating performance comprises the steps of:
   activating first and second switches coupling current from said at least one secondary winding to said output filter synchronously with a first voltage state of said primary and secondary windings;
   activating a third switch maintaining flow of current through said output filter while bypassing said secondary winding synchronously with a second voltage state of said primary and secondary windings; and
   modulating activation time of said first and second switches to regulate at least one of said output voltage and said output current.

14. The method of claim 13, wherein said first activating step further comprises coupling said first and second switches together in series between said secondary winding and said output filter.

15. The method of claim 14, wherein said first activating step further comprises coupling said first switch to a first end of said secondary winding and coupling said second switch to a second end of said secondary winding.

16. The method of claim 13, wherein said modulating step further comprises modulating a leading edge of said activation time of said first and second switches.

17. The method of claim 13, wherein said modulating step further comprises modulating a trailing edge of said activation time of said first and second switches.

* * * * *